(12) United States Patent
Zhang et al.

(10) Patent No.: US 10,804,830 B1
(45) Date of Patent: Oct. 13, 2020

(54) METHOD FOR CONTROLLING SPEED REGULATION SYSTEM OF ASYNCHRONOUS MOTOR BASED ON BUCK-BOOST MATRIX CONVERTER

(71) Applicant: HUNAN UNIVERSITY OF SCIENCE AND TECHNOLOGY, Xiangtan, Hunan (CN)

(72) Inventors: Xiaoping Zhang, Hunan (CN); Ji Liu, Hunan (CN); Ruirui Zhang, Hunan (CN)

(73) Assignee: Hunan University of Science and Technology, Xingtan (CN)

( * ) Notice: Subject to any disclaimer, the term of this patent is extended or adjusted under 35 U.S.C. 154(b) by 0 days.

(21) Appl. No.: 16/926,369

(22) Filed: Jul. 10, 2020

Related U.S. Application Data (63) Continuation of application No. PCT/CN2019/084694, filed on Apr. 27, 2019.

(30) Foreign Application Priority Data

Jun. 22, 2018 (CN) .......................... 2018 1 0652769

(51) Int. Cl.
*H02P 27/04* (2016.01)
*H02P 21/13* (2006.01)
*H02P 27/12* (2006.01)

(52) U.S. Cl.
CPC ............ *H02P 21/13* (2013.01); *H02P 27/045* (2013.01); *H02P 27/12* (2013.01);
(Continued)

(58) Field of Classification Search
CPC ..... H02P 21/13; H02P 27/045; H02P 2207/01
(Continued)

(56) References Cited

U.S. PATENT DOCUMENTS 4,926,105 A * 5/1990 Mischenko ............. H02P 21/06
318/800
9,376,025 B2 * 6/2016 Kim ........................ B60L 53/22
(Continued)

FOREIGN PATENT DOCUMENTS

| CN | 103414337 A | 11/2013 |
|---|---|---|
| CN | 103475298 A | 12/2013 |

(Continued)

*Primary Examiner* — Erick D Glass
(74) *Attorney, Agent, or Firm* — Wayne & Ken, LLC (57) ABSTRACT

An actual rotation speed of the asynchronous motor is detected according to the given rotation speed thereof. A given voltage of the asynchronous motor is obtained according to a vector control algorithm and a PI-IP control algorithm and is used as a reference output voltage of the BBMC. A duty cycle of a power switch tube in the BBMC is obtained according to a finite-time control algorithm by taking capacitor voltages and inductor currents in the BBMC as control variables of the speed regulation system. The conducting time of the power switch tube in the BBMC is controlled according to the duty cycle and an output control signal of a corresponding switching cycle, so that an output voltage consistent with its reference output voltage is obtained at an output end of the BBMC, so that the actual rotation speed of the asynchronous motor accurately tracks the given speed.

6 Claims, 4 Drawing Sheets

(52) U.S. Cl.
CPC ...... *H02P 2201/07* (2013.01); *H02P 2205/05* (2013.01); *H02P 2207/01* (2013.01)

(58) Field of Classification Search
USPC .................................................. 318/801, 774
See application file for complete search history.

(56) References Cited

U.S. PATENT DOCUMENTS

2005/0225280 A1 10/2005 Anwar et al.
2017/0302209 A1* 10/2017 Royak ..................... H02P 23/14

FOREIGN PATENT DOCUMENTS

| | | |
|---|---|---|
| CN | 105871212 A | 8/2016 |
| CN | 106487287 A | 3/2017 |

* cited by examiner

METHOD FOR CONTROLLING SPEED REGULATION SYSTEM OF ASYNCHRONOUS MOTOR BASED ON BUCK-BOOST MATRIX CONVERTER

CROSS-REFERENCE TO RELATED APPLICATIONS

This application is a continuation of International Application No. PCT/CN2019/084694 with a filing date of Apr. 27, 2019, which claims the benefit of priority from Chinese Application No. 201810652769.X with a filing date of Jun. 22, 2018. The content of the aforementioned applications, including any intervening amendments thereto, are incorporated herein by reference.

TECHNICAL FIELD

The present application relates to the controlling of asynchronous motors, and more particularly to a method for controlling a speed regulation system of an asynchronous motor based on a Buck-Boost matrix converter.

BACKGROUND

As an environmental-friendly frequency converter, Buck-Boost matrix converters (BBMCs) have a simple topology and a series of ideal electrical characteristics, which is applicable for variable frequency speed regulation systems of asynchronous motors.

At present, in terms of control methods for the BBMCs applied to speed regulation systems of asynchronous motors, Chinese Patent Application No. 201310460536.7, titled "Device and method for vector control of an asynchronous motor" proposes a double closed-loop control method based on PID control to achieve a general speed control of the asynchronous motor, and it however has the problems of a low speed control accuracy in steady-state conditions and low dynamic performance, failing to meet the control requirements of high-performance speed regulation systems.

SUMMARY

The present disclosure provides a method for controlling a speed regulation system of an asynchronous motor based on a Buck-Boost matrix converter.

The present disclosure provides a method for controlling a speed regulation system of an asynchronous motor based on a Buck-Boost matrix converter, comprising:

(1) detecting an actual rotation speed of the asynchronous motor, and obtaining a speed deviation according to a given speed and the actual rotation speed of the asynchronous motor;

(2) calculating a reference torque of the asynchronous motor using a PI-IP control algorithm according to the speed deviation of the asynchronous motor;

(3) calculating a given voltage $u_{ref}$ of the asynchronous motor using a vector control algorithm according to the reference torque of the asynchronous motor;

(4) taking the given voltage of the asynchronous motor obtained in step (3) as a reference output voltage of the BBMC and capacitor voltages and inductor currents in the BBMC as control variables of the speed regulation system, establishing a state differential equation of the BBMC;

(5) establishing a state differential equation of single-phase stator windings of the asynchronous motor according to an equivalent circuit of the single-phase stator windings of the asynchronous motor;

(6) obtaining a dynamic equation of the speed regulation system according to the state differential equation of the BBMC and the state differential equation of the single-phase stator windings of the asynchronous motor;

(7) designing a control function of the speed regulation system according to the dynamic equation of the speed regulation system;

(8) obtaining a duty cycle of a power switch tube in the BBMC according to the dynamic equation and the control function of the speed regulation system; and (9) controlling the power switch tube in the BBMC according to the duty cycle of the power switch tube in the BBMC obtained in step (8) to obtain an output voltage consistent with a reference output voltage of the BBMC at an output end of the BBMC, so that the actual rotation speed of the asynchronous motor accurately tracks the given speed.

Compared to the prior art, the disclosure has the following beneficial effects.

The disclosure provides a method for controlling a speed regulation system of an asynchronous motor based on a Buck-Boost matrix converter, in which an actual rotation speed of the asynchronous motor is detected according to a given speed and the actual rotation speed of the asynchronous motor; a given voltage of the asynchronous motor is obtained by performing a PI-IP control algorithm calculation and a vector control algorithm calculation; the given voltage of the asynchronous motor is taken as a reference output voltage of the BBMC, and the capacitor voltage and the inductor current in the BBMC are taken as control variables of the speed regulation system, so that a duty cycle of a power switch tube in the BBMC is obtained according to a finite-time control algorithm; and the conducting time of the power switch tube in the BBMC is controlled according to the duty cycle and an output control signal of a corresponding switching cycle, so that an output voltage consistent with its reference output voltage is obtained at an output end of the BBMC. The disclosure achieves an accurate tracking for a given rotation speed of the asynchronous motor, thereby achieving an accurate control for the rotation speed of the asynchronous motor.

DETAILED DESCRIPTION OF EMBODIMENTS

The present disclosure will be further described in detail below with reference to the accompanying drawings and embodiments.

Figure 1:
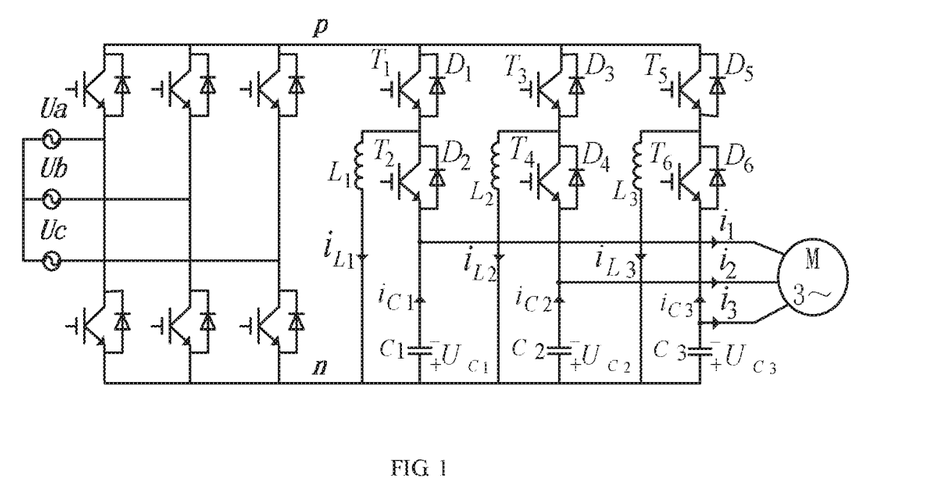
FIG. 1 shows a topology of a main circuit in a BBMC according to the present disclosure.

As shown in FIG. 1, provided is a topology of a main circuit in a BBMC according to the present disclosure. The BBMC includes a rectifier side and an inverter side, where the rectifier side is a three-phase PWM rectifier circuit for rectifying a three-phase AC voltage into a PWM-modulated DC voltage; and the inverter side is a three-phase Buck- Boost inverter, which consists of three Buck-Boost DC/DC converters with the same structure. Since an output voltage of the BBMC mainly depends on the control for the Buck-Boost inverter, a separate control unit is built for each of the three Buck-Boost DC/DC converters for the control of the three-phase Buck-Boost inverter. A capacitor voltage and an inductor current in each control unit are taken as control variables of the speed regulation system, and a finite-time control algorithm is adopted to control these two control variables of the speed regulation system, so that the actual output voltage of the BBMC is consistent with its reference output voltage.

Figure 2:
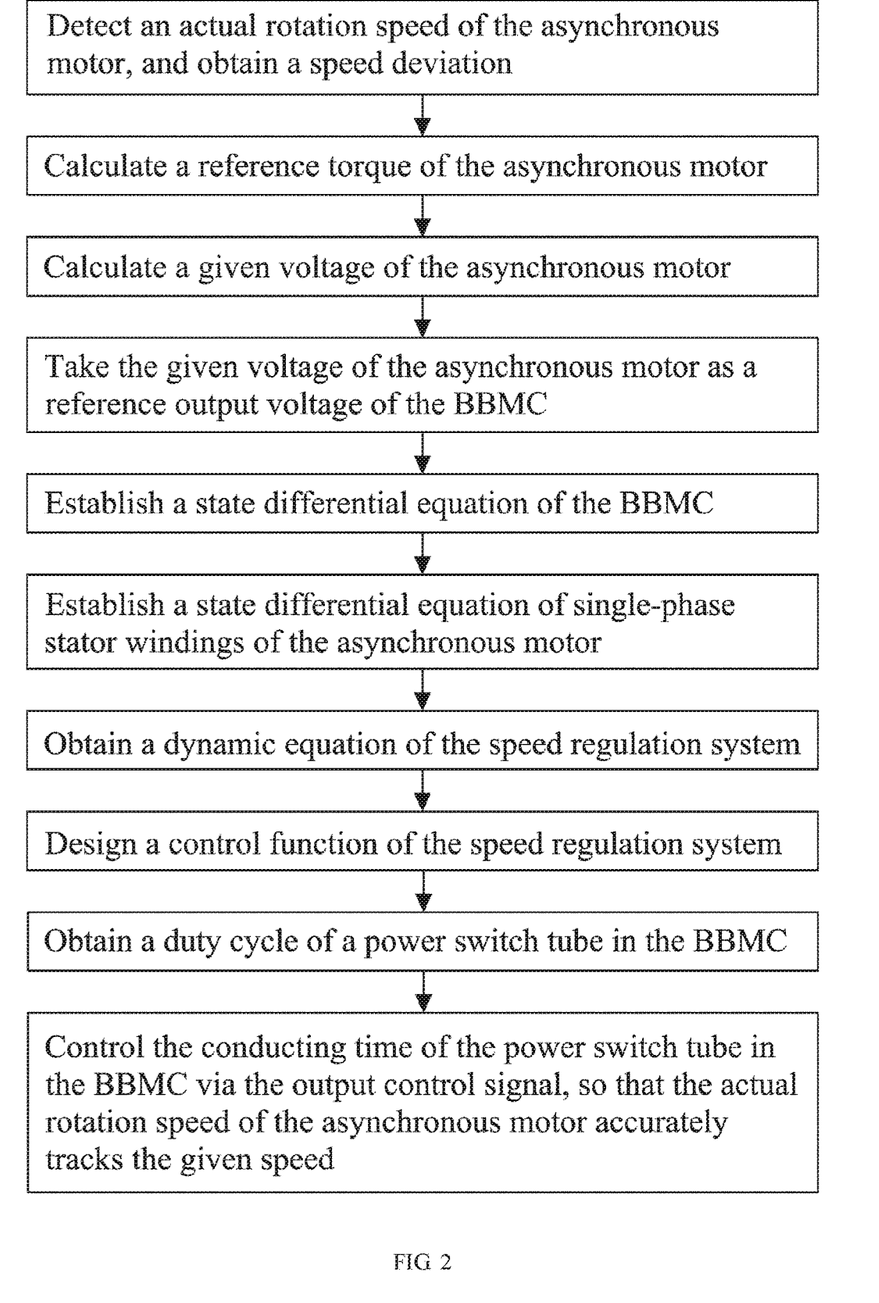
FIG. 2 is a flowchart of a method for controlling a speed regulation system of an asynchronous motor based on a Buck-Boost matrix converter according to the present disclosure.

As shown in FIG. 2, provided is a flowchart of a method for controlling a speed regulation system of an asynchronous motor based on a Buck-Boost matrix converter of the present disclosure, including the following steps:

(1) an actual rotation speed of an asynchronous motor is detected, and a speed deviation is obtained according to a given speed and the actual rotation speed of the asynchronous motor;

(2) a reference torque of the asynchronous motor is calculated using a PI-IP control algorithm according to the speed deviation of the asynchronous motor;

(3) a given voltage $u_{ref}$ of the asynchronous motor is obtained using a vector control algorithm based on the reference torque of the asynchronous motor;

(4) taking the given voltage of the asynchronous motor obtained in step (3) as a reference output voltage of the BBMC, a state differential equation of the BBMC is established, where capacitor voltages and inductor currents in the BBMC are taken as control variables of the speed regulation system;

(5) a state differential equation of single-phase stator windings of the asynchronous motor is established according to an equivalent circuit thereof;

(6) a dynamic equation of the speed regulation system is obtained according to the state differential equation of the BBMC and the state differential equation of the single-phase stator windings of the asynchronous motor;

(7) a control function of the speed regulation system is designed according to the dynamic equation of the speed regulation system;

(8) a duty cycle of a power switch tube in the BBMC is obtained according to the dynamic equation and the control function of the speed regulation system; and (9) the power switch tube in the BBMC is controlled according to the duty cycle of the power switch tube in BBMC obtained in step (8) to obtain an output voltage consistent with the reference output voltage of the BBMC at an output end of the BBMC, so that the actual rotation speed of the asynchronous motor accurately tracks the given speed.

Figure 3:
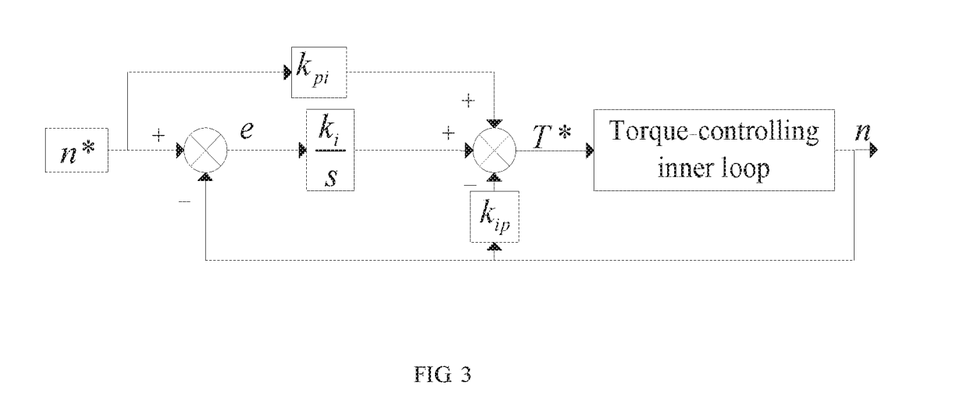
FIG. 3 is a functional block diagram of a speed-controlling outer loop based on PI-IP control according to the present disclosure.

As shown in FIG. 3, provided is a functional block diagram of a speed-controlling outer loop based on PI-IP control algorithm according to the present disclosure. In the disclosure, the asynchronous motor is controlled based on a PI-IP control-based vector control method, including a speed-controlling outer loop based on PI-IP control and a torque-controlling inner loop based on vector control, where the PI-IP control algorithm adopted in the speed-controlling outer loop is specifically as follows.

1) The actual rotation speed n of the asynchronous motor is detected, and a speed deviation is obtained according to the given speed n* thereof as shown in equation (1):

$$e = n^* - n \qquad (1).$$

2) An incremental expression of the reference torque $T^*_e$ of the asynchronous motor is obtained using the PI-IP control algorithm according to the speed deviation e of the asynchronous motor, including the following specific steps:

a) a corresponding time domain expression of the reference torque of the asynchronous motor is obtained according to the given speed n*, the actual rotation speed n and the PI-IP control algorithm, as shown in equation (2):

$$T^*_e = k_{pi} n^* - k_{ip} n + k_i \int_0^t e; \qquad (2)$$

b) the equation (2) is expressed in an incremental form, as shown in equation (3):

$$T^*_e = k_{pi}[n^*(k) - n^*(k-1)] + k_i e(k) - k_{ip}[n(k) - n(k-1)] \qquad (3):$$

where $k_{pi}$, $k_i$ and $k_{ip}$ are control parameters, and are obtained by an engineering trial and error method or an optimization algorithm.

3) The reference torque obtained in the equation (3) is taken as the reference torque of the torque-controlling inner loop, and the torque-controlling inner loop is controlled based on the vector control algorithm, so that an actual torque of the asynchronous motor is consistent with the reference torque, and thus, a corresponding input given voltage of the asynchronous motor is obtained, which is used as the reference output voltage of the BBMC.

Figure 4:
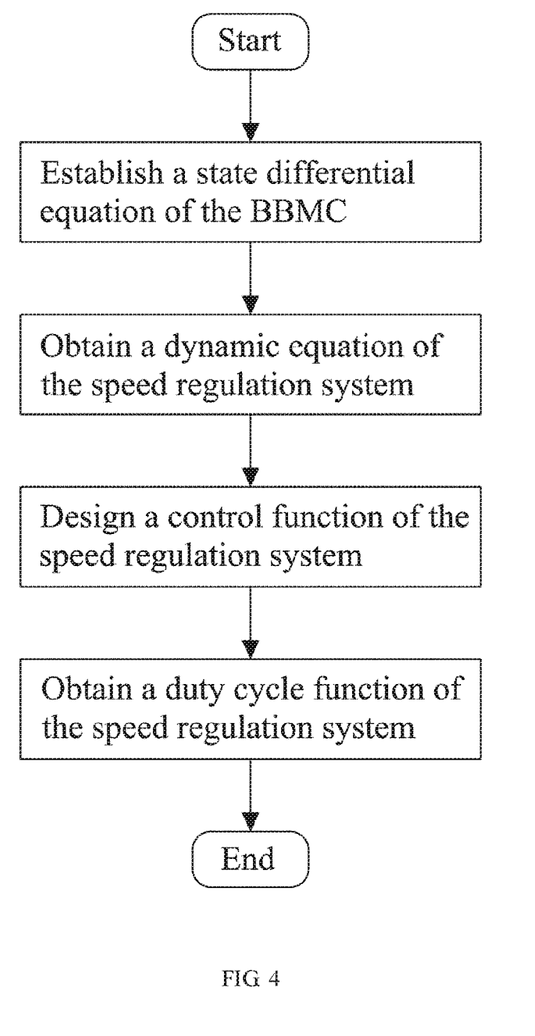
FIG. 4 is a flowchart of a finite-time control algorithm for the BBMC according to the present disclosure.

As shown in FIG. 4, provided is a flowchart of a finite-time control algorithm in the BBMC according to the present disclosure, in which the capacitor voltage and the inductor current in the BBMC are taken as the control variables of the speed regulation system, and the duty cycle of the corresponding power switch tube in the BBMC is obtained according to the finite-time control algorithm; the power switch tube in the BBMC is controlled according to the duty cycle, so that the actual output voltage of the BBMC accurately tracks the reference output voltage thereof. The specific implementation is as follows:

1) a state differential equation of the BBMC is established;

a) it is assumed that all circuit components in the BBMC are ideal devices, and the input power supply is an ideal power supply; where the circuit components include: power switch tubes, diodes, inductors and capacitors;

b) the state differential equation of the BBMC is established according to Kirchhoff's law when the power switch tubes in the BBMC are respectively in on and off states, as shown in equation (4):

$$\begin{cases} i_L = \dfrac{u_C}{L} + \dfrac{u_C + u_D}{L} d \\ u_C = \dfrac{i_L}{C} - \dfrac{i_L}{C} - \dfrac{i_L}{C} d \end{cases} ; \qquad (4)$$

where $u_D$ is the voltage in a DC side of the BBMC; $u_C$ is the capacitor voltage; $i_L$ is the inductor current; $i_1$ is the output current of the BBMC; L and C are respectively the inductance parameter and the capacitance parameter at the inverter side of the BBMC; and d is the duty cycle of the power switch tubes in the BBMC, where $d \in [0,1]$;

2) the state differential equation of the single-phase stator windings of the asynchronous motor is expressed as follows:

$$\dot{i}_1 = \frac{i_1 R}{L_1} - \frac{u_C}{L_1} + \frac{u_{DZ}}{L_1}; \tag{5}$$

where $u_{DZ}$ is the voltage in the common terminal of the three-phase stator windings of the asynchronous motor; R and $L_1$ are respectively the equivalent resistance and the equivalent inductance of the single-phase stator windings of the asynchronous motor;

3) for the Buck-Boost DC/DC converter, when the speed regulation system reaches a steady state, the relationship between the capacitor voltage and the input DC voltage of the Buck-Boost DC/DC converter is expressed as follows:

$$u_C = \frac{d}{1-d} u_D; \tag{6}$$

for the converter, a process of transferring electric energy from a DC input side to an output side includes the following steps: firstly the power switch tube $T_1$ is controlled to turn on, so that the DC power source in the input side charges the inductor $L_1$ through the power switch tube $T_1$; after a period of time, the power switch tube $T_1$ is turned off so that the electric energy stored in the inductor $L_1$ is discharged to the capacitor $C_1$ through a flyback diode $D_2$, and the capacitor $C_1$ supplies power to the asynchronous motor. Therefore, the load current $i_1$ of the BBMC is equal to an average current of the flyback diode $D_2$, and the average current of the flyback diode $D_2$ is further equal to an average current of the inductor when the power switch tube $T_1$ is turned off and thus $$i_1 = (1-d) i_L \tag{7};$$

and an equation $$i_L = \frac{i_L(u_C + u_D)}{u_D}$$

can be obtained from equation (6) and equation (7), and $$i_1 = \frac{u_C - u_{DZ}}{R + j\omega L_1}$$

is plugged into the equation (7) to obtain:

$$i_L = \frac{(u_C - u_{DZ})(u_C + u_D)}{u_D(R + j\omega L_1)}; \tag{8}$$

when the capacitor voltage $u_C$ reaches to a reference value $u_{Cref}$, the reference value $i_{Lref}$ of the inductor current $i_L$ is:

$$i_{Lref} = \frac{(u_{Cref} - u_{DZ})(u_{Cref} + u_D)}{u_D(R + jwL_1)}; \tag{9}$$

4) the dynamic equation of the speed regulation system is obtained according to the state differential equation of the BBMC obtained in step 1) and the state differential equation of the asynchronous motor, and the specific steps are as follows:

a) an energy storage function of the speed regulation system is established as follows:

$$x_1 = \frac{L i_L^2}{2} + \frac{C(u_C + u_D)^2}{2}; \tag{10}$$

b) the first derivative and the second derivative of the energy storage function are respectively calculated as follows:

$$\dot{x}_1 = x_2 = u_D i_L - (u_C + u_D) i_1; \tag{11}$$

$$\dot{x}_2 = \left[\frac{u_D(u_D + u_C)}{L} - \frac{i_L i_1}{C}\right] d - \frac{u_D u_C}{L} - \frac{(i_L - i_1) i_1}{C} - \frac{(u_C + u_D)(i_1 R - u_C + u_{DZ})}{L}; \tag{12}$$

and the dynamic equations of the speed regulation system are constructed based on the equation (11), equation (12) and an output equation of the speed regulation system $y=x_1$, as shown in equation (13):

$$\begin{cases} \dot{x}_1 = u_D i_L - (u_C - u_D) i_1 \\ \dot{x}_2 = \left[\frac{u_D(u_D + u_C)}{L} - \frac{i_L i_1}{C}\right] d - \\ \quad\quad \frac{u_D u_C}{L} - \frac{(i_L - i_1) i_1}{C} - \frac{(u_C + u_D)(i_1 R - u_C + u_{DZ})}{L} \\ y = x_1 \end{cases}; \tag{13}$$

5) the control function of the speed regulation system is designed according to the dynamic equations of the speed regulation system, including the following steps:

a) a deviation $\lambda_1$ of the energy storage function $x_1$ and its reference variable $x_{1ref}$ (i.e., $\lambda_1 = x_1 - x_{1ref}$) and a deviation $\lambda_2$ of the first derivative $x_2$ and its reference variable $x_{2ref}$ (i.e., $\lambda_2 = x_2 - x_{2ref}$) are respectively taken as the target variables, and derivatives of the target variable $\lambda_1$ and the target variable $\lambda_2$ are respectively calculated to establish dynamic error equations of the speed regulation system, as shown in equation (14):

$$\begin{cases} \dot{\lambda}_1 = \lambda_2 \\ \dot{\lambda}_2 = u \end{cases}; \tag{14}$$

where u is the control function;

b) the control function u of the speed regulation system is determined according to the target variables $\lambda_1$, $\lambda_2$ and the finite-time control algorithm, as shown in equation (15):

$$u = -k_1[sat_{\alpha_1}(\lambda_1) + \lambda_1] - k_2[sat_{\alpha_2}(\lambda_2) + \lambda_2] \tag{15},$$

where sat is the saturation function, and $k_1$, $k_2$, $\alpha_1$, and $\alpha_2$ are the control parameters;

specifically, $$sat_{\alpha_1}(\lambda_1) = \begin{cases} \text{sign}(\lambda_1), & |\lambda_1| > 1 \\ \text{sign}^{\alpha_1}(\lambda_1), & |\lambda_1| \le 1 \end{cases}, \text{ and}$$

$$sat_{\alpha_2}(\lambda_2) = \begin{cases} \text{sign}(\lambda_2), & |\lambda_2| > 1 \\ \text{sign}^{\alpha_1}(\lambda_1), & |\lambda_2| \le 1 \end{cases};$$

6) a duty cycle function of the power switch tube in the BBMC is obtained according to the dynamic error equation (14) and the control function equation (15) of the speed regulation system, and the specific steps are as follows:

a) an equation is obtained based on $\lambda_2 = x_2 - x_{2ref}$ and the dynamic equations of the speed regulation system:

$$\dot{\lambda}_2 = \dot{x}_2 = \left[\frac{u_D(u_D + u_C)}{L} - \frac{i_L i_1}{C}\right]d - \frac{u_D u_C}{L} - \frac{(i_L - i_1)i_1}{C} - \frac{(u_C + u_D)(i_1 R - u_C + u_{DZ})}{L};$$

b) the control function of the speed regulation system is obtained according to the equation obtained in step 1) and the dynamic error expression (14) of the speed regulation system:

$$u = \left[\frac{u_D(u_D + u_C)}{L} - \frac{i_L i_1}{C}\right]d - \frac{u_D u_C}{L} - \frac{(i_L - i_1)i_1}{C} - \frac{(u_C + u_D)(i_1 R - u_C + u_{DZ})}{L}; \quad (16)$$

c) the duty cycle function of the speed regulation system is obtained according to the control function u obtained in step b) and the equation (15), as shown in equation (17):

$$d = \frac{CL_1 u_D(Lu + u_C u_D) + L_1 L_1^2 u_C + CL u_D(u_C + u_D)(Ri_1 - u_C + u_{DZ})}{CL_1(u_C + u_D)(u_D^2 + i_L^2)}. \quad (17)$$

Described above is only a preferred embodiment of the present disclosure. It should be noted that any improvement and variation made by those skilled in the art without departing from the spirit of the present disclosure shall fall within the scope of the appended claims.

What is claimed is:

1. A method for controlling a speed regulation system of an asynchronous motor based on a Buck-Boost matrix converter (BBMC), comprising:
   (1) detecting an actual rotation speed of the asynchronous motor, and obtaining a speed deviation according to a given speed and the actual rotation speed of the asynchronous motor;
   (2) calculating a reference torque of the asynchronous motor using a PI-IP control algorithm according to the speed deviation of the asynchronous motor;
   (3) calculating a given voltage of the asynchronous motor using a vector control algorithm according to the reference torque of the asynchronous motor;
   (4) taking the given voltage of the asynchronous motor obtained in step (3) as a reference output voltage of the BBMC and capacitor voltages and inductor currents in the BBMC as control variables of the speed regulation system, establishing a state differential equation of the BBMC;
   (5) establishing a state differential equation of single-phase stator windings of the asynchronous motor according to an equivalent circuit of the single-phase stator windings of the asynchronous motor;
   (6) obtaining a dynamic equation of the speed regulation system according to the state differential equation of the BBMC and the state differential equation of the single-phase stator windings of the asynchronous motor;
   (7) designing a control function of the speed regulation system according to the dynamic equation of the speed regulation system;
   (8) obtaining a duty cycle of a power switch tube in the BBMC according to the dynamic equation and the control function of the speed regulation system; and
   (9) controlling the power switch tube in the BBMC according to the duty cycle of the power switch tube in the BBMC obtained in step (8) to obtain an output voltage consistent with a reference output voltage of the BBMC at an output end of the BBMC, so that the actual rotation speed of the asynchronous motor accurately tracks the given speed.

2. The method of claim 1, wherein the state differential equation of the BBMC in step (4) is shown as:

$$\begin{cases} \dot{i}_L = \frac{u_C}{L} + \frac{u_C + u_D}{L}d \\ \dot{u}_C = \frac{i_L}{C} - \frac{i_1}{C} - \frac{i_L}{C}d \end{cases};$$

wherein $u_D$ is the voltage in a DC side of the BBMC; $u_C$ is the capacitor voltage; $i_L$ is the inductor current; $i_1$ is the output current of the BBMC; L and C are respectively the inductance parameter and the capacitance parameter at an inverter side of the BBMC; and d is the duty cycle of the power switch tube in the BBMC, wherein $d \in [0,1]$.

3. The method of claim 1, wherein the state differential equation of the single-phase stator windings of the asynchronous motor in step (5) is shown as:

$$\dot{i}_1 = \frac{i_1 R}{L_1} - \frac{u_C}{L_1} + \frac{u_{DZ}}{L_1};$$

wherein $u_{DZ}$ is the voltage in a common terminal of the three-phase stator windings of the asynchronous motor; R and $L_1$ are respectively the equivalent resistance and the equivalent inductance of the single-phase stator windings of the asynchronous motor; $u_C$ is the capacitor voltage; and $i_1$ is the output current of the BBMC.

4. The method of claim 1, wherein the step (6) comprises:
   (6.1) establishing an energy storage function of the speed regulation system:

$$x_1 = \frac{Li_L^2}{2} + \frac{C(u_C + u_D)^2}{2};$$

wherein L and C are respectively the inductance parameter and the capacitance parameter at an inverter side of the BBMC; $i_L$ is the inductor current; $u_C$ is the capacitor voltage; $u_D$ is the voltage in a DC side of the BBMC; and (6.2) calculating a first derivative and a second derivative of the energy storage function of the speed regulation system respectively to obtain:

$$\dot{x}_1 = x_2 = u_D i_L - (u_C + u_D)i_1;$$

$$\dot{x}_2 = \left[\frac{u_D(u_D + u_C)}{L} - \frac{i_L i_1}{C}\right]d - \frac{u_D u_C}{L} - \frac{(i_L - i_1)i_1}{C} - \frac{(u_C + u_D)(i_1 R - u_C + u_{DZ})}{L};$$

wherein L and C are respectively the inductance parameter and the capacitance parameter at the inverter side of the BBMC; $u_C$ is the capacitor voltage; $i_L$ is the inductor current; $u_D$ is the voltage in a DC side of the BBMC; $i_1$ is the output current of the BBMC; d is the duty cycle of the power switch tube in the BBMC; $u_{DZ}$ is the voltage in a common terminal of the three-phase stator windings of the asynchronous motor; and R is the equivalent resistance of the single-phase stator windings of the asynchronous motor, and constructing the dynamic equation of the speed regulation system based on the first derivative and the second derivative of the energy storage function, and an output equation of the speed regulation system $$y = x_1 : \begin{cases} \dot{x}_1 = u_D i_L - (u_C - u_D)i_1 \\ \dot{x}_2 = \left[\frac{u_D(u_D + u_C)}{L} - \frac{i_L i_1}{C}\right]d - \frac{u_D u_C}{L} - \frac{(i_L - i_1)i_1}{C} - \frac{(u_C + u_D)(i_1 R - u_C + u_{DZ})}{L} \\ y = x_1 \end{cases};$$

wherein L and C are respectively the inductance parameter and the capacitance parameter at the inverter side of the BBMC; $u_C$ is the capacitor voltage; $i_L$ is the inductor current; $u_D$ is the voltage in a DC side of the BBMC; $i_1$ is the output current of the BBMC; d is the duty cycle of the power switch tube in the BBMC; $u_{DZ}$ is the voltage in a common terminal of the three-phase stator windings of the asynchronous motor; and R is the equivalent resistance of the single-phase stator windings of the asynchronous motor.

5. The method of claim 1, wherein the step (7) comprises:

(7.1) taking a deviation $\lambda_1$ of the energy storage function $x_1$ and a reference variable $x_{1ref}$ of the energy storage function $x_1$ and a deviation $\lambda_2$ of the first derivative $x_2$ of the energy storage function $x_1$ and a reference variable $x_{2ref}$ of the first derivative $x_2$ as target variables, respectively, wherein $\lambda_2 = x_2 - x_{2ref}$; and $\lambda_1 = x_1 - x_{1ref}$; calculating derivatives of the target variable $\lambda_1$ and the target variable $\lambda_2$ respectively, to obtain a dynamic error equation of the speed regulation system:

$$\begin{cases} \dot{\lambda}_1 = \lambda_2 \\ \dot{\lambda}_2 = u \end{cases};$$

wherein u is the control function;

(7.2) determining the control function u of the speed regulation system according to the target variables $\lambda_1$ and $\lambda_2$, the dynamic error equation and a finite-time control algorithm:

$$u = -k_1[sat_{\alpha_1}(\lambda_1) + \lambda_1] - k_2[sat_{\alpha_2}(\lambda_2) + \lambda_2];$$

wherein sat is the saturation function, and $k_1$, $k_2$, $\alpha_1$ and $\alpha_2$ are the control parameters.

6. The method of claim 1, wherein in the step (8), the duty cycle is expressed as:

$$d = \frac{CL_1 u_D(Lu + u_C u_D) + L_1 L i_1^2 u_C + CL u_D(u_C + u_D)(Ri_1 - u_C + u_{DZ})}{CL_1(u_C + u_D)(u_D^2 + i_L^2)};$$

wherein L and C are respectively the inductance parameter and the capacitance parameter at the inverter side of the BBMC; $u_C$ is the capacitor voltage; $i_L$ is the inductor current; $u_D$ is the voltage in the DC side of the BBMC; $i_1$ is the output current of the BBMC; d is the duty cycle of the power switch tube in the BBMC; $u_{DZ}$ is the voltage in a common terminal of the three-phase stator windings of the asynchronous motor; and R and $L_1$ are respectively the equivalent resistance and the equivalent inductance of the single-phase stator windings of the asynchronous motor.

\* \* \* \* \*